United States Patent
Sax et al.

(10) Patent No.: US 10,268,727 B2
(45) Date of Patent: Apr. 23, 2019

(54) BATCHING TUPLES

(71) Applicant: Hewlett-Packard Development Company, L.P., Houston, TX (US)

(72) Inventors: Matthias J. Sax, Berlin (DE); Maria Guadalupe Castellanos, Sunnyvale, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 609 days.

(21) Appl. No.: 14/780,641

(22) PCT Filed: Mar. 29, 2013

(86) PCT No.: PCT/US2013/034541
§ 371 (c)(1),
(2) Date: Sep. 28, 2015

(87) PCT Pub. No.: WO2014/158183
PCT Pub. Date: Oct. 2, 2014

(65) Prior Publication Data
US 2016/0154853 A1    Jun. 2, 2016

(51) Int. Cl.
G06F 17/30    (2006.01)
G06F 9/54    (2006.01)

(52) U.S. Cl.
CPC ........ *G06F 17/30516* (2013.01); *G06F 9/542* (2013.01); *G06F 17/3033* (2013.01)

(58) Field of Classification Search
CPC ......... G06F 17/30584; G06F 17/30592; G06F 17/30312; G06F 17/3033; G06F 17/30442
USPC .......... 707/602, 713, 714, 999.002, 999.003, 707/999.005, 999.102, E17.005, E17.059, 707/706, 707, 709, 711, 712, 715, 716, 707/717, 718, 719, 721, 723, 736, 747, 707/752, 754, 758, 769, 781, 797, 809, 707/966, 971, 972, 999.1, 999.101, 707/999.104; 717/104, 127
See application file for complete search history.

(56) References Cited

U.S. PATENT DOCUMENTS

| | | | |
|---|---|---|---|
| 5,724,600 A * | 3/1998 | Ogi | G06F 9/5083 712/11 |
| 6,047,323 A | 4/2000 | Krause | |
| 6,571,244 B1 | 5/2003 | Larson | |
| 6,640,244 B1 | 10/2003 | Bowman-Amuah | |
| 7,555,481 B1 * | 6/2009 | Verma | G06F 17/30362 |

(Continued)

FOREIGN PATENT DOCUMENTS

| | | |
|---|---|---|
| CN | 102521234 | 6/2012 |
| CN | 102640151 | 8/2012 |

OTHER PUBLICATIONS

Schneider et al. ("Tutorial: Stream Processing Optimizations"; DEBS'13, Jun. 29-Jul. 3, 2013, Arlington Texas, USA; Copyright 2013 ACM 978-1-4503-1758-0/13/06) (Year: 2013).*

(Continued)

*Primary Examiner* — Jay A Morrison
*Assistant Examiner* — Ken Hoang
(74) *Attorney, Agent, or Firm* — Brooks, Cameron & Huebsch, PLLC (57) ABSTRACT

A technique of batching tuples can include determining a plurality of key-attributes for a plurality of tuples, creating a batch tuple, and calculating a hash value for the batch tuple.

14 Claims, 5 Drawing Sheets

(56) References Cited

U.S. PATENT DOCUMENTS

| | | | |
|---|---|---|---|
| 7,590,751 | B2 | 9/2009 | Cheung et al. |
| 7,613,848 | B2 | 11/2009 | Amini et al. |
| 7,814,486 | B2 | 10/2010 | Papakipos |
| 2002/0039420 | A1 | 4/2002 | Shacham et al. |
| 2004/0225897 | A1* | 11/2004 | Norton .................... H04L 63/02 726/14 |
| 2008/0154934 | A1* | 6/2008 | Lau ..................... G06F 12/0866 |
| 2011/0276962 | A1 | 11/2011 | Chambers et al. |
| 2012/0297391 | A1 | 11/2012 | Andrade |
| 2013/0124668 | A1* | 5/2013 | Idziorek ................ H04L 47/125 709/214 |

OTHER PUBLICATIONS

Extended European Search Report dated Oct. 17, 2016; EP Application No. 13879806.1; pp. 12.

Leonardo Neumeyer et al: "S4: Distributed Stream Computing Platform", Data Mining Workshops (ICDMW), 2010 IEEE International Conference on, IEEE, Piscataway, NJ, USA, Dec. 13, 2010 (Dec. 13, 2010), pp. 170-177, XP03185360.

Matthias J Sax et al: "Performance optimization for distributed intra-node-parallel streaming systems", Data Engineering Workshops (ICDEW), 2013 IEEE 29th International Conference on, IEEE, Apr. 8, 2013 (Apr. 8, 2013), pp. 62-69, XP032431592.

Tyson Condie et al: "MapReduce Online", NSDI '10 Proceedings of the 7th Systems Design and Implementation, Apr. 28, 2010 (Apr. 28, 2010).

Balkesen, C et al, "Scalable Data Partitioning Techniques for Parallel Sliding Window Processing Over Data Streams". Aug. 2011.

Chen, et al., "Communicating Tuples in a Message", PCT Application No. PCT/US2012/060770, Filed Oct. 18, 2012, 18 pages.

Sax, et al., "Streaming System Performance Optimization", U.S. Appl. No. 13/705,952, filed Dec. 5, 2012, 27 pages.

* cited by examiner

BATCHING TUPLES

BACKGROUND

Data received from data sources can be communicated as a stream. In scenarios where relatively large amounts of data are to be processed, a distributed streaming system having multiple processing nodes can be provided to perform processing of different portions of a data stream in parallel.

DETAILED DESCRIPTION

Due to the popularity of applications that process multiple pieces of data in real-time or near-real-time, use of streaming systems has increased. A streaming system can communicate data received from a number of data sources as a data stream (e.g., in a sequence of digitally encoded packets of data and/or information). For example, search engines and social media applications can use streaming systems to process multiple queries and messages in real-time. A streaming system can, in some examples, include a distributed streaming system which can perform parallel processing (e.g., perform processing of portions of a data stream simultaneously). Utilizing a distributed streaming system for parallel processing can increase overall system performance.

A streaming system can include a number of stream operators. A stream operator can include a publisher operator that produces data streams that are to be sent to a subscriber operator for consumption. A subscriber operator can receive a data stream from another stream operator (e.g., from a publisher operator and/or another subscriber operator). A stream operator (e.g., a publisher operator and/or a subscriber operator) can include a number of instances. An instance can include a copy of an executable version of a program (e.g., computer readable instructions) and/or process loaded into memory on a computing device.

A dataflow between stream operators can be modeled as a directed acyclic graph (DAG) comprising nodes and edges, wherein nodes represent the stream operators and edges represent the connections between the nodes. Stream operators can include machine readable instructions that execute on a processor to perform a particular function, such as a particular arithmetic function. Further, stream operators can generate output streams that are sent to other stream operators. For example, a stream operator can receive tuples comprising data from a source operator, and can process the tuples to generate output tuples which are sent to another stream operator for processing.

Generally, a distributed streaming system can transmit tuples individually from publisher operators to subscriber operators. However, this process can be time consuming and resource intensive. In contrast, distributed streaming systems can batch tuples which can improve the throughput of streaming systems as compared to individually transmitting tuples. Batching can include grouping tuples together (e.g., as a batch) in order to process those tuples at once and/or with more efficiency.

In non-data-parallel streaming systems batching can be done without consideration of the content of the tuples (e.g., without consideration of the attributes of the tuple). However, in distributed streaming systems, tuples cannot be batched arbitrarily. To achieve efficient operation of the distributed streaming system, a tuple with a particular attribute (e.g., a value and/or quality used in identifying the tuple) can be consistently routed to a corresponding subscriber operator instance. The corresponding subscriber operator instance can process the data and possibly cache data of the given tuple. If data of the given tuple is not routed to a corresponding subscriber operator instance, the data grouping semantic may not be achieved, which may lead to processing of a given piece of data by more than one stream operator. Although a performance optimization system may be used to determine which tuples in the dataflow to batch, and the optimum batch sizes, this may result in many batches being sent to the same consumer, which increases latency and increases memory usage. Furthermore, such a technique may require the user to consider batching when writing dataflow requirements because the batching scheme is not transparent.

In contrast, in accordance with a number of examples of the present disclosure, tuples can be batched together based on a particular key (e.g., a plurality of attributes and/or characteristics) and sent to a subscriber operator instance based on that key. It can be determined which subscriber operator instance to send the batch tuple to by calculating a numerical and/or alphanumerical value for the batch tuple (e.g., a hash value). Batching tuples in this manner can minimize the number of batches, while meeting partitioning requirements and reducing latency. Additionally, this technique can enable transparent implementation with respect to the underlying streaming system and the user code, thereby enabling batching without changing the code of the streaming system or the code of the user program. Further, batching tuples in this manner can be implemented independent of the implementation of the underlying streaming system. Additional examples, advantages, features, modifications and the like are described below with reference to the drawings.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designator "N", particularly with respect to reference numerals in the drawings, indicate that a number of the particular feature so designated can be included with a number of examples of the present disclosure. Also, as used herein, "a number of" an element and/or feature can refer to one or more of such elements and/or features.

Figure 1:
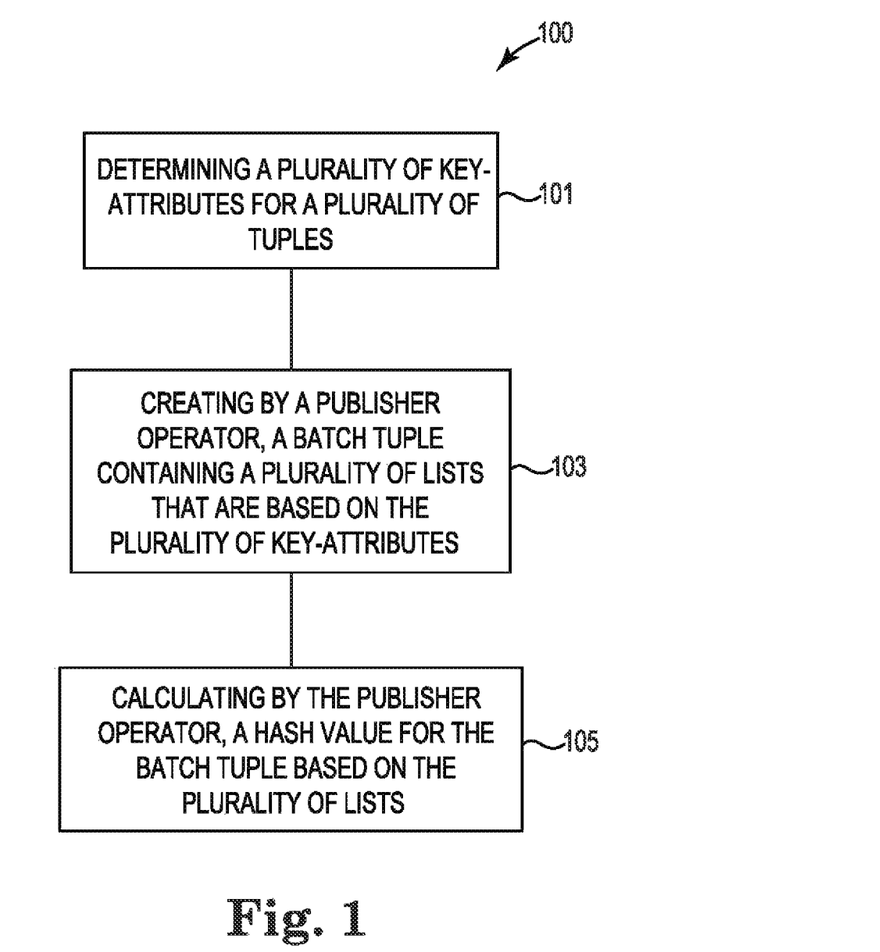
FIG. 1 is a flow chart of an example process for batching tuples according to the present disclosure.

FIG. 1 is a flow chart of a method 100 for batching tuples according to the present disclosure. At 101, the method 100 can include determining a plurality of key-attributes for a plurality of tuples. In some examples, a plurality of attributes for the plurality of tuples can be determined by a processing node. A processing node, as used herein, can include a number of computers and/or processors that are communicatively coupled in a network infrastructure. Each processing node can execute a stream operator that applies a respective operation on data received by the processing node. In a number of examples, the stream operator executing in a processing node can transform data received and/or can compute result data based on received data.

A processing node can also process a data stream input. For example, a data stream input can include a continuous stream of data that are processed by the processing node. The distributed streaming system can process the data stream input using the processing node and output the processed data as a data stream output. In some examples, the processing node can include a number of multicore central processing units (CPUs) that can perform parallel processing, such as instruction pipelining.

In various examples, a processing node can determine a plurality of attributes for each of a plurality of tuples in a data stream. Determining a plurality of attributes for each of the plurality of tuples can include executing computer-readable instructions to assign a particular classification (e.g., an attribute) to the tuple. An attribute can describe a type and/or classification of data included in the tuple. A tuple can include a number of attributes, wherein each respective attribute includes a number of values. For example, attributes of a tuple relating to employees of an enterprise can include an employee identifier, an employee name, and/or a department identifier (to identify a department that the employee works in). In such an example, each attribute in the tuple can include a value such as a number for the employee identifier, the spelling of the employee's name, and/or an alpha-numerical value for a department identifier for the respective employee. However, examples are not so limited and an attribute can include a variety of different values used in identifying the tuple.

In some examples, a tuple can include a number of attributes, at least some of which are key-attributes. A key-attribute can include an attribute that is used to match a tuple to a key in order to identify a group (e.g., a batch tuple) that the tuple belongs. As an example, if a tuple includes attributes X, Y, and Z, and a key includes attribute X, then X can be a key-attribute for the tuple. In a different example, the key can include a plurality of attributes, such as X and Y, in which case X and Y could be key-attributes for the tuple.

At 103, the method 100 can include creating, by a publisher operator, a batch tuple containing a plurality of lists that are based on the plurality of attributes. Each list can include a number of attributes and/or key-attributes.

A plurality of tuples can be combined (e.g., batched) into a larger message (e.g., a batch tuple) to be sent from a first stream operator instance to a second stream operator instance. Tuples can be batched together based on which group the tuples belong to (e.g., key-based data distribution). In other words, tuples can be batched based on a key, wherein the key can identify a number of key-attributes of the batched tuples. As an example, if a key includes attribute X, then the batch tuple created based on that key can include tuples that include key-attribute X. In a different example, the key can include multiple attributes, such as X and Y, in which case the batch tuple can include tuples that include key-attributes X and Y. As discussed further in relation to FIG. 2, the batch tuple can be created by creating a plurality of lists of key-attributes from the plurality of tuples (e.g., a vertical layout), wherein each of the plurality of lists includes a same hash value for the key-attributes.

Batching of tuples can be performed by a publisher operator instance in a processing node prior to the processing node sending the batched tuples to a subscriber operator instance. As used herein, a batch tuple can include a key portion containing the key-attribute and/or key-attributes of the respective key, and/or a payload portion that includes the grouped tuples. The grouped tuples in the payload of the batch tuple can be provided in a relation (e.g., a table) that includes multiple rows containing respective ones of the tuples that have been batched into the batch tuple.

At 105, the method 100 can include calculating by the publisher operator, a hash value for the batch tuple based on the plurality of lists. A hash value, as discussed further herein, can include a numerical and/or alphanumerical value that can identify respective partitions of stream operator instances.

In some examples, a data stream can be partitioned across a number of stream operator instances for parallel processing. In such examples, partitioning the data stream can include hash partitioning. Hash partitioning can include computing hash values based on corresponding values of a key in the batch tuple, such as by applying a hash function on the key-attributes of the batch tuple. The hash values can identify respective partitions of stream operator instances. For example, a first hash value and/or a first range of hash values can correspond to a first partition (e.g., a first stream operator instance), a second hash value and/or a second range of hash values can correspond to a second partition (e.g., a second stream operator instance), and so forth.

Figure 2:
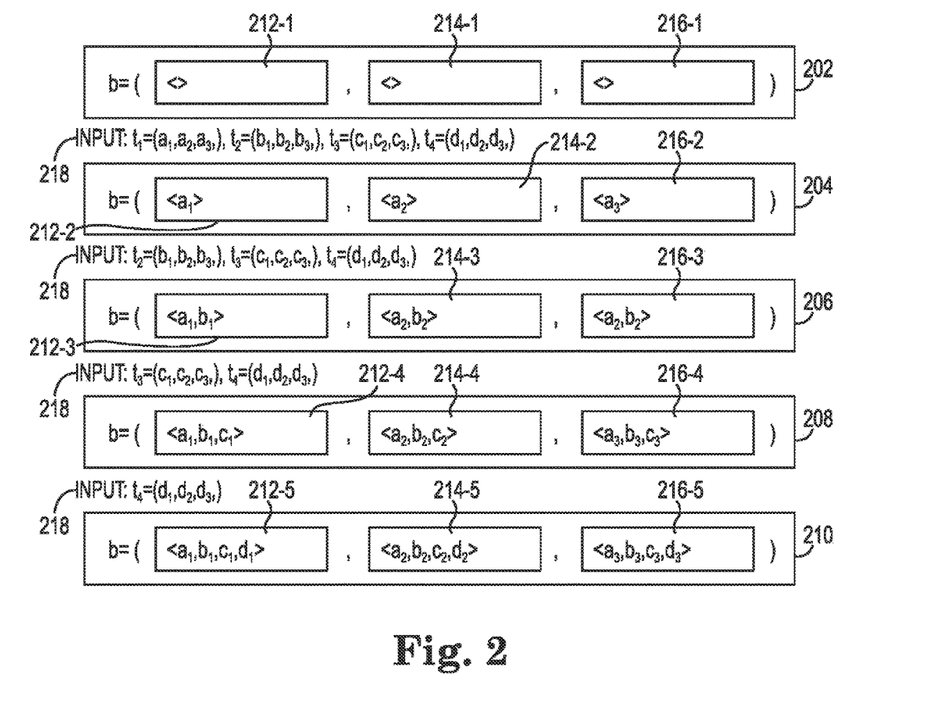
FIG. 2 is an illustration of an example process for batching tuples using a vertical layout according to the present disclosure.

As discussed further in relation to FIG. 2, a hash value can be calculated based on the plurality of lists (e.g., each of the individual attribute lists). A hash value for any one key-attribute in each of the plurality of lists can include an equal value. Thereby, an arbitrary key-attribute from each list in a batch tuple can be selected, and a hash value can be calculated for the arbitrary value. By calculating a hash value for each list within a batch tuple, a hash value can be calculated for the batch tuple. Once a hash value for a batch tuple is determined, the batch tuple can be sent to the corresponding subscriber operator instance.

FIG. 2 is an illustration of an example process 200 for batching tuples using a vertical layout according to the present disclosure. As illustrated, a batch tuple can be created by creating a series of intermediate batch tuples (e.g., 204, 206, 208), wherein each key-attribute from a plurality of tuples is added to the plurality of lists in the batch tuple. For example, the batch tuple 210 includes lists 212-5, 214-5, and 216-5, wherein each list contains a number of key-attributes (e.g., $a_1$, $b_1$, $c_1$; $a_2$, $b_2$, $c_2$; and $a_3$, $b_3$, $c_3$). The foregoing example illustrates a batch tuple including three lists, wherein each list includes four key-attributes. However, examples are not so limited. A batch tuple can include a number of different lists, including a number of different attributes, wherein at least some of the attributes are key-attributes. However, each list in a batch (e.g., 212-5) includes a number of key-attributes with a same hash value. In other words, in list 212-5, the hash value for key-attribute $a_1$ is the same as the hash value for key-attribute $b_1$, which is the same as the hash value for key-attribute $c_1$.

To build the batch tuple 210, a plurality of tuples 218 (e.g., $t_1$, $t_2$, $t_3$, $t_4$) can be received in a data input stream. A plurality of attributes can be determined for each of the plurality of tuples 218. For example, $a_1$, $a_2$, and $a_3$ can represent three key-attributes for tuple 1 (e.g., $t_1$). Similarly, $b_1$, $b_2$, and $b_3$ can represent the same three key-attributes for tuple 2 (e.g., $t_2$), and so forth.

A first intermediate batch tuple 204 can be created by adding the key-attributes for tuple 1 to each list 212-1, 214-1, and 216-1. If the value for key-attribute 1 of tuple 1 is $a_1$, then the first value in list 212-2 can be $a_1$. Similarly, if the value for key-attribute 2 of tuple 1 is $a_2$, then the first value in list 214-2 can be $a_2$.

A second intermediate batch tuple 206 can be created by adding the key-attributes for tuple 2 to each list 212-2, 214-2, and 216-2. For example, if the value of key-attribute 1 for tuple 2 is $b_1$ then the second value in list 212-3 can be $b_1$. The second and third key-attributes for tuple 2 can be added to the second position of lists 214-3 and 216-3, respectively.

A third intermediate batch tuple 208 can be created by adding the key-attributes for tuple 3 to each list 212-3, 214-3, and 216-3. As the first intermediate batch tuple 204 and the second intermediate batch tuple 206, each key-attribute from tuple 3 can be added to the third position of lists 212-4, 214-4, and 216-4.

The batch tuple 210 can be created by adding the key-attributes for tuple 4 to lists 212-4, 214-4, and 216-4. In the foregoing example, each of the plurality of tuples 218 includes three key-attributes and the batch tuple 210 includes three lists (e.g., the number of lists is equal to the number of key-attributes in the plurality of tuples). However, examples in accordance with the present disclosure are not so limited. In another example, if each of the plurality of tuples 218 includes five key-attributes, then the batch tuple 210 would include five lists. In either example, and as illustrated by the batch tuple 210, the number of key-attributes comprising the number of lists (e.g., 212-5, 214-5, and 216-5) is equal to the number of tuples in the plurality of tuples 218.

In some examples, a hash value can be calculated for the batch tuple 210. A hash value can be calculated for the batch tuple 210 by selecting a value from each list 212-5, 214-5, and 216-5, and calculating a hash value for each of the selected values. For example, a hash value for the batch tuple 210 can include a hash value for key-attribute $a_1$, a hash value for key-attribute $a_2$ and a hash value for key-attribute $a_3$. However, in a number of examples, a hash value for the batch tuple 210 can include hash values for only a portion of the key-attributes in the batch tuple. For example, a hash value for the batch tuple 210 can include a hash value for key-attribute $a_1$, and a hash value for key-attribute $a_2$. In either example, the selected key-attribute can be selected from the same position within each list 212-5, 214-5, and 216-5.

Figure 3:
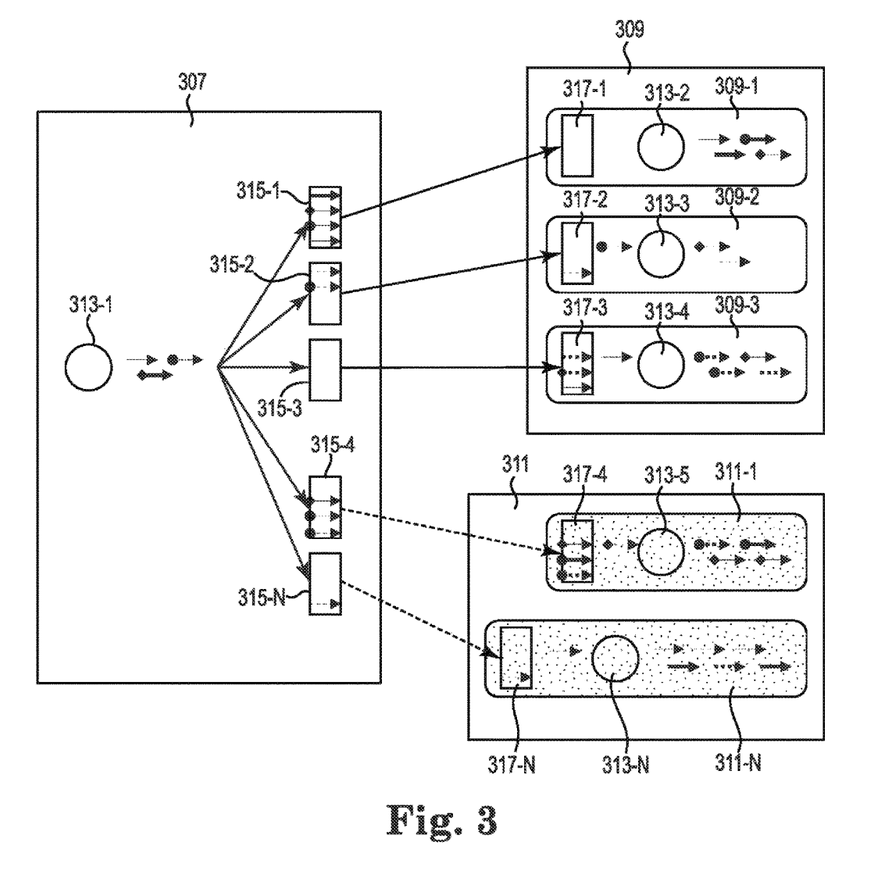
FIG. 3 is an illustration of an example of a distributed streaming system utilizing distinct batches for multiple subscriber operator instances, according to the present disclosure.

FIG. 3 is an illustration of an example of a distributed streaming system utilizing distinct batches for multiple subscriber operator instances, according to the present disclosure. In a number of examples, a processing node in a publisher operator instance (e.g., 307) can send a plurality of batch tuples to a plurality of subscriber operator instances (e.g., 309-1, 309-2, 309-3, 311-2, . . . , 311-N). Also, publisher operator instance 307 can send a number of batch tuples to a number of different subscribers (e.g., 309 and 311). FIG. 3 illustrates one instance of publisher operator (e.g., 307). However, examples are not so limited, and a publisher operator can include a number of different instances, wherein each instance can send a plurality of tuples to a number of different operator instances.

In a number of examples, publisher operator instance 307 can include a number of output buffers 315-1, 315-2, 315-3, 315-4, and 315-N. The number output buffers 315-1, . . . , 315-N can depend on the number of subscriber operator instances 309-1, . . . , 311-N. For example, because publisher operator instance 307 is sending batch tuples to five different subscriber operator instances 309-1, . . . , 311-N, publisher operator instance 307 can include five different output buffers 315-1, . . . 315-N.

Each of the number of output buffers 315-1, . . . , 315-N can create a batch tuple, including a key portion corresponding to a particular subscriber operator instance 309-1, . . . , 311-N. For example, output buffer 315-1 can create batch tuples having particular key-attributes, corresponding to subscriber operator instance 309-1 (e.g., the particular key-attributes represented as solid arrows with any tail shape). In such an example, batch tuples created by output buffer 315-1 can be sent to subscriber operator instance 309-1. In another example, output buffer 315-2 can create batch tuples having particular key-attributes, corresponding to subscriber operator instance 309-2 (e.g., the particular key-attributes represented as fine dashed arrows with any tail shape). In such example, batch tuples created by output buffer 315-2 can be sent to subscriber operator instance 309-2. Similarly, output buffer 315-3 can create batch tuples having particular key-attributes corresponding to operator instance 309-3 (e.g., the particular key-attributes represented as dashed arrows with any tail shape); output buffer 315-4 can create batch tuples having particular key-attributes corresponding to operator instance 311-1 (e.g., the particular key-attributes represented as arrows with round and square tail shape with any line style); and output buffer 315-N can create batch tuples having particular key attributes corresponding to operator instance 311-N (e.g., the particular key-attributes represented as arrows with plain tail shape with any line style).

In other words, each of the number of output buffers 315-1, . . . , 315-N can create distinct batches of tuples having particular key-attributes corresponding to each of the number of subscriber operator instances. In an example, output buffer 315-1 can create batch tuples having key-attributes in a first group (e.g., for subscriber instance 309-1), output buffer 315-2 can create batch tuples having key-attributes in a second group (e.g., for subscriber operator instance 309-2), output buffer 315-3 can create batch tuples having key-attributes in a third group (e.g., for subscriber operator instance 309-3), output buffer 315-4 can create batch tuples having key-attributes in a fourth group (e.g., for subscriber operator instance 311-1), and output buffer 315-N can create batch tuples having key-attributes in a fifth group (e.g., for subscriber operator instance 311-N).

In a number of examples, each of the number of output buffers 315-1, . . . , 315-N can create a batch tuple by adding an key-attribute to the number of lists comprising the batch tuple (e.g. as discussed in relation to FIG. 2). Once an output buffer (e.g., particular output buffer 315-1) has completed creating a batch (e.g., the batch is full and/or the key-attributes from a set number of tuples have been distributed among a number of lists), the output buffer (e.g., 315-1) can send the batch tuple to the input buffer (e.g., 317-1) for the corresponding subscriber operator instance (e.g., 309-1). For example, the output buffer (e.g., 315-1) can send the batch tuple to the input buffer (e.g., 317-1) based on the hash value for the batch tuple. Once received, the subscriber operator instance receiving the batch tuple can unpack and deserialize the tuples in the relation in the payload of the batch tuple.

As mentioned herein, each stream operator (e.g., publisher operator instance 307, and subscriber operator instances 309-1, . . . , 311-N) can include a processing node (e.g., 313-1, 313-2, . . . , 313-6), that can include a number of computers and/or processors that are communicatively coupled in a network infrastructure.

Figure 4:
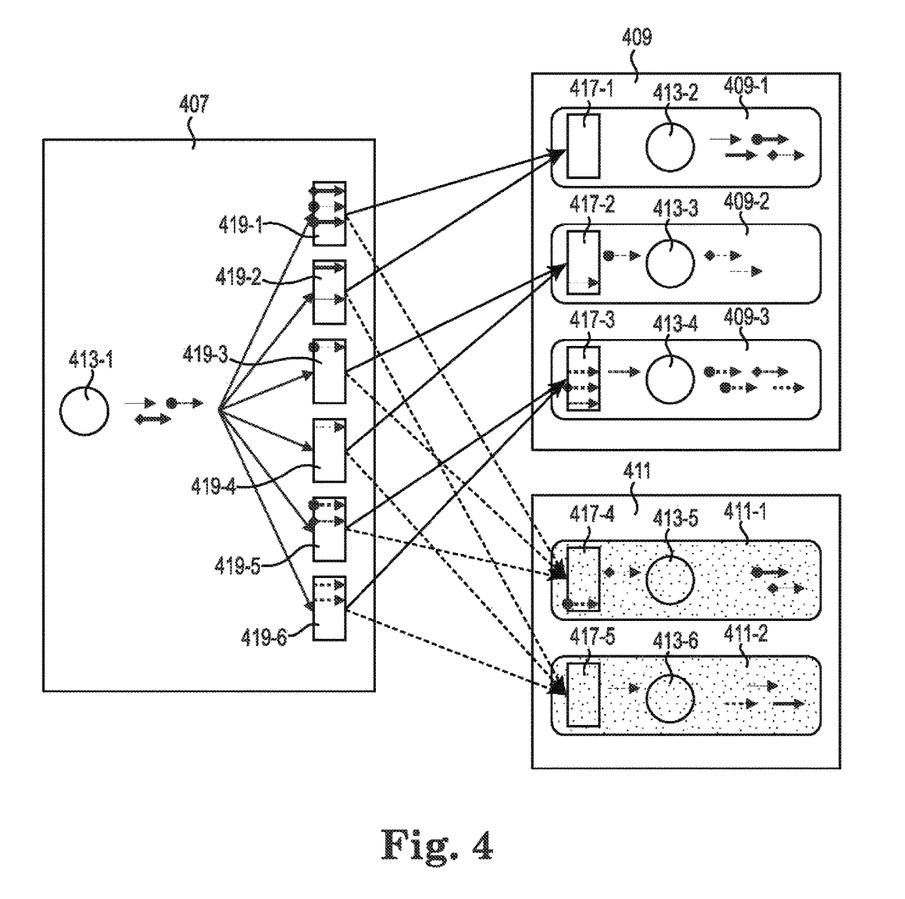
FIG. 4 is an illustration of an example of a distributed streaming system utilizing shared batches for multiple subscriber operator instances, according to the present disclosure.

FIG. 4 is an illustration of an example of a distributed streaming system utilizing shared batches for multiple subscriber operator instances, according to the present disclosure. In a number of examples, a processing node in a publisher operator instance (e.g., 407) can send a plurality of batch tuples to a plurality of subscriber operator instances (e.g., 409-1, 409-2, 409-3, 411-2, and 411-2) using a set of shared buffers.

In a number of examples, publisher operator instance 407 can include a number of output buffers 419-1, 419-2, 419-3, 419-4, 419-5, and 419-6. The number output buffers 419-1, . . . , 419-6 can depend on the number of subscriber operator instances 409-1, . . . , 411-2, wherein the number of output buffers 419-1, . . . , 419-6 equals the number of instances of the first subscriber (e.g., 409-1, 409-2, and 409-3) multiplied by the number of instances of the second subscriber (e.g., 411-1 and 411-2). For example, because subscriber 409 has three instances (e.g., 409-1, . . . , 409-3), and subscriber 411 has two instances (e.g., 411-1 and 411-2), publisher operator instance 407 can include six (e.g., 2×3) different output buffers 419-1, . . . , 419-6. Examples are not so limited, however, and publisher operator instance 407 can send batch tuples to more or less subscribers and/or subscriber instances than shown in FIG. 4.

In a distributed streaming system utilizing shared batches for multiple subscriber operator instances, each of the number of output buffers 419-1, . . . , 419-6 can create a batch tuple, and send the batch tuple to multiple subscriber operator instances (e.g., 409-1, . . . , and 411-2). In such example, a shared batch can put two tuples into the same output buffer (e.g., 419-1) if the hash value of the key-attributes of the first subscriber operator instance (e.g., 409-1) are the same as the hash value of the key-attributes of the second subscriber operator instance (e.g., 411-1).

For instance, output buffer 419-1 can create batch tuples having key-attributes in a first group (e.g., the first group illustrated in FIG. 4 as fine solid and bold solid arrows with shaped tails), and can send the batch tuple to multiple subscriber operator instances (e.g., 409-1 and 411-1). In such example, output buffer 419-1 can send batch tuples to input buffer 417-1, which accepts batch tuples having a key-attribute included in the first group (e.g., input buffer 417-1 accepts fine solid and bold solid arrows with any tail shape), and to input buffer 417-4, which also accepts batch tuples having a key-attribute included in the first group (e.g., input buffer 417-4 accepts arrows with shaped tails and any line style) based on hash value. In another example, output buffer 419-2 can create batch tuples having key-attributes in a second group (e.g., the second group illustrated in FIG. 4 as fine solid and bold solid arrows with plain tails), and can send batch tuples to input buffer 417-1, which accepts batch tuples having a key-attribute included in the second group (e.g., input buffer 417-1 accepts fine solid and bold solid arrows with any tail shape), and to input buffer 417-5, which accepts batch tuples having a key-attribute included in the second group (e.g., input buffer 417-5 accepts arrows with plain tails) based on hash value.

Figure 5:
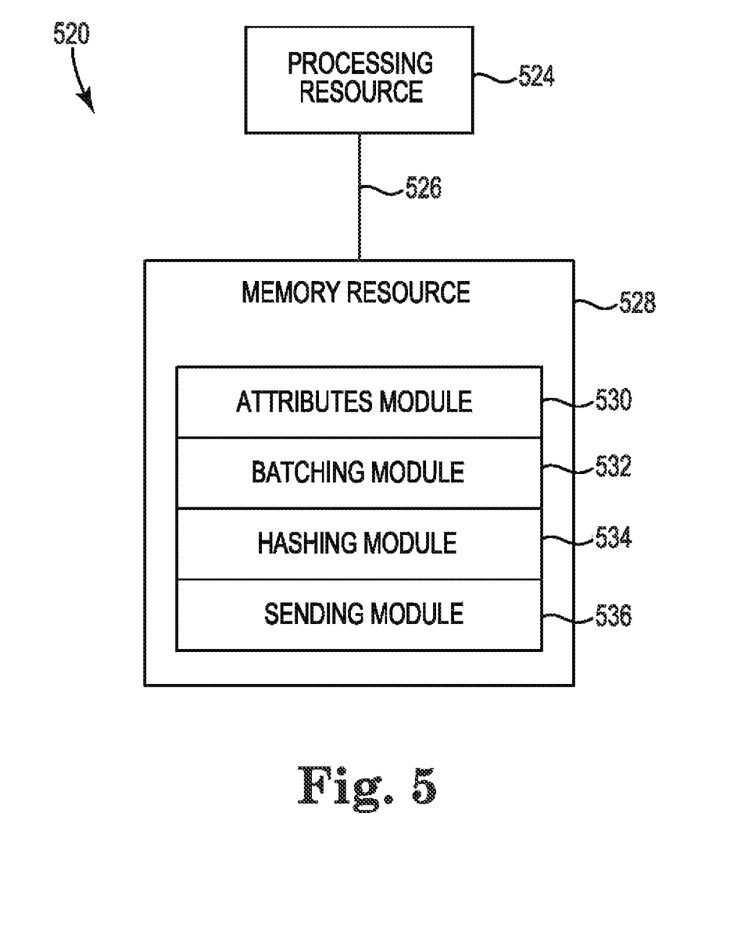
FIG. 5 illustrates an example of a system according to the present disclosure.

FIG. 5 illustrates an example of a system 520 according to the present disclosure. The system 520 can use software, hardware, firmware, and/or logic to perform a number of functions.

The system 520 can be any combination of hardware and program instructions configured to batch tuples in a dedicated streaming system. The hardware, for example can include a processing resource 524, and/or a memory resource 528 (e.g., computer-readable medium (CRM), machine readable medium (MRM), database, etc.) A processing resource 524, as used herein, can include any number of processors capable of executing instructions stored by a memory resource 528. Processing resource 524 may be integrated in a single device or distributed across devices. The program instructions (e.g., computer-readable instructions (CRI)) can include instructions stored on the memory resource 528 and executable by the processing resource 524 to implement a desired function (e.g., determine a plurality of attributes for a plurality of tuples, etc.).

The memory resource 528 can be in communication with a processing resource 524. A memory resource 528, as used herein, can include any number of memory components capable of storing instructions that can be executed by processing resource 524. Such memory resource 528 can be a non-transitory CRM. Memory resource 528 may be integrated in a single device or distributed across devices. Further, memory resource 528 may be fully or partially integrated in the same device as processing resource 524 or it may be separate but accessible to that device and processing resource 524. Thus, it is noted that the system 522 may be implemented on a user and/or a client device, on a server device and/or a collection of server devices, and/or on a combination of the user device and the server device and/or devices.

The processing resource 524 can be in communication with a memory resource 528 storing a set of CRI executable by the processing resource 524, as described herein. The CRI can also be stored in remote memory managed by a server and represent an installation package that can be downloaded, installed, and executed. The system 522 can include memory resource 528, and the processing resource 524 can be coupled to the memory resource 528.

Processing resource 524 can execute CRI that can be stored on an internal or external memory resource 528. The processing resource 524 can execute CRI to perform various functions, including the functions described with respect to FIGS. 1-4. For example, the processing resource 524 can execute CRI to batch tuples using a vertical layout.

The CRI can include a number of modules 530, 532, 534, 536. The number of modules 530, 532, 534, 536 can include CRI that when executed by the processing resource 524 can perform a number of functions. In a number of examples, the number of modules 530, 532 534, 536 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The number of modules 530, 532, 534, 536 can be sub-modules of other modules. For example, the attributes module 530 and the batching module 532 can be sub-modules and/or contained within the same computing device. In another example, the number of modules 530, 532, 534, 536 can comprise individual modules at separate and distinct locations (e.g., CRM, etc.).

An attributes module 530 can include CRI that when executed by the processing resource 524 can provide a number of functions. The attributes module 530 can determine by a publisher operator, a plurality of key-attributes for a plurality of tuples.

A batching module 532 can include CRI that when executed by the processing resource 524 can perform a number of batching functions. The batching module 532 can create a batch tuple containing a plurality of lists that are based on the plurality of attributes from a plurality of tuples.

A hashing module 534 can include CRI that when executed by the processing resource 524 can perform a number of calculation functions. The hashing module 534 can calculate a hash value for a batch tuple based on the plurality of lists contained in the batch tuple.

A sending module 536 can include CRI that when executed by the processing resource 524 can perform a number of sending functions. The sending module 536 can send a plurality of distinct batch tuples to a corresponding particular subscriber operator instance based on the hash value for the distinct batch tuple. The sending module 536 can also send each of a plurality of batch tuples to a number of subscriber operator instances that share a common hash value.

In some examples, the number of modules can include a debatching module. A debatching module (not shown in FIG. 5) can include CRI that when executed by the processing resource 524 can perform a number of debatching functions. The debatching module can receive a batch tuple at a subscriber operator instance, debatch the batch tuple, and process each tuple in the batch.

A memory resource 528, as used herein, can include volatile and/or nonvolatile memory. Volatile memory can include memory that depends upon power to store information, such as various types of dynamic random access memory (DRAM), among others. Non-volatile memory can include memory that does not depend upon power to store information.

The memory resource 528 can be integral, or communicatively coupled, to a computing device, in a wired and/or a wireless manner. For example, the memory resource 528 can be an internal memory, a portable memory, a portable disk, or a memory associated with another computing resource (e.g., enabling CRIs to be transferred and/or executed across a network such as the Internet).

The memory resource 528 can be in communication with the processing resource 524 via a communication path 526. The communication path 526 can be local or remote to a machine (e.g., a computing device) associated with the processing resource 524. Examples of a local communication path 526 can include an electronic bus internal to a machine (e.g., a computing device) where the memory resource 528 is one of volatile, non-volatile, fixed, and/or removable storage medium in communication with the processing resource 524 via the electronic bus.

The communication path 526 can be such that the memory resource 528 is remote from the processing resource (e.g., 424), such as in a network connection between the memory resource 528 and the processing resource (e.g., 524). That is, the communication path 526 can be a network connection. Examples of such a network connection can include a local area network (LAN), wide area network (WAN), personal area network (PAN), and the Internet, among others. In such examples, the memory resource 528 can be associated with a first computing device and the processing resource 524 can be associated with a second computing device (e.g., a Java® server).

For example, a processing resource 524 can be in communication with a memory resource 528, wherein the memory resource 528 includes a set of instructions and wherein the processing resource 524 is designed to carry out the set of instructions.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for batching tuples comprising:
   determining a plurality of key-attributes for each of a plurality of tuples, wherein each key-attribute of each tuple describes a type or classification of data in the tuple;
   creating, by a processor of a publisher operator, a batch tuple in a buffer containing a plurality of lists based on the plurality of key-attributes of the plurality of tuples, including:
      creating a series of intermediate batch tuples, wherein each of the intermediate batch tuples is created for one of the tuples and contains the plurality of lists, and
      adding the plurality of key-attributes of each of the tuples into the plurality of lists of one of the intermediate batch tuples in a sequential order such that a last one of the series of intermediate batch tuples contains the plurality of key-attributes of all of the tuples in the plurality of lists;
   calculating, by the processor, a hash value for the batch tuple in the buffer based on the plurality of lists;
   when the buffer containing the batch tuple is full, determining, by the processor, a subscriber operator instance having a same hash value as the batch tuple; and
   sending, by the processor, the batch tuple in the buffer to the subscriber operator instance that has the same hash value as the batch tuple.

2. The method of claim 1, wherein each of the plurality of lists contains a key-attribute among the plurality of key-attributes from each of the plurality of tuples.

3. The method of claim 1, wherein the plurality of lists in each of the intermediate batch tuples includes a number of intermediate lists, wherein each key-attribute from the plurality of key-attributes for the plurality of tuples is added to the number of intermediate lists.

4. The method of claim 1, wherein creating the batch tuple includes creating a first list in the plurality of lists, wherein each key-attribute in the first list includes a same hash value.

5. The method of claim 1, wherein calculating the hash value for the batch tuple includes calculating a hash value for each of the plurality of lists in the batch tuple.

6. A non-transitory computer-readable medium storing a set of instructions executable by a processing resource to cause a computer to:

determine a plurality of key-attributes for each of a plurality of tuples, wherein each key-attribute of each tuple describes a type or classification of data in the tuple;

create a particular batch tuple in a buffer containing a plurality of lists, by:
creating a series of intermediate batch tuples, wherein each of the intermediate batch tuples contains the plurality of lists, and
adding the plurality of key-attributes of each of the tuples into the plurality of lists of one of the intermediate batch tuples in a sequential order such that a last one of the series of intermediate batch tuples contains the plurality of key-attributes of all of the tuples in the plurality of lists;

calculate a hash value for the batch tuple based on the hash value for the plurality of key-attributes; and when buffer containing the particular batch tuple is full, determining a corresponding subscriber operator instance having a same hash value as the particular batch tuple and send the particular batch tuple to the corresponding subscriber operator instance.

7. The non-transitory computer-readable medium of claim 6, wherein the set of instructions executable by the processing resource includes instructions to:
in addition to the particular batch tuple, create a first distinct batch tuple in a first output buffer for a first corresponding subscriber operator instance, wherein the first distinct batch tuple includes a key for all tuples in a first group; and
create a second distinct batch tuple in a second output buffer for a second corresponding subscriber operator instance, wherein the second distinct batch tuple includes a key for all tuples in a second group.

8. The non-transitory computer-readable medium of claim 7, wherein the set of instructions executable by the processing resource includes instructions to send each of the first and second distinct batch tuples from one of the first and second output buffers in a producer operator instance to an input buffer in the corresponding subscriber operator instance.

9. The non-transitory computer-readable medium of claim 7, wherein the set of instructions executable by the processing resource includes instructions to unpack and deserialize the tuples in each of the first and second distinct batch tuples upon receipt by the corresponding subscriber operator instance.

10. A system for batching tuples in a distributed streaming system, the system comprising:
a processing resource;
a memory resource storing instructions that when executed cause the processing resource to:
determine a plurality of key-attributes for each of a plurality of tuples, wherein each key-attribute of each tuple describes a type or classification of data in the tuple;
create a particular batch tuple in a buffer containing a plurality of lists, by:
creating a series of intermediate batch tuples, wherein each of the intermediate batch tuples contains the plurality of lists, and
adding the plurality of key-attributes of each of the tuples into the plurality of lists of one of the intermediate batch tuples in a sequential order such that a last one of the series of intermediate batch tuples contains the plurality of key-attributes of all of the tuples in the plurality of lists;
calculate a hash value for the particular batch tuple based on the plurality of key-attributes; and
when the buffer containing the particular batch tuple is full, determine a corresponding subscriber operator instance having a same hash value as the particular batch tuple and send the particular batch tuple to the corresponding subscriber operator instance.

11. The system of claim 10, wherein the instructions are executable to cause the processing resource to create additional batch tuples in output buffers to send to subscriber operator instances, wherein a total number of the output buffers is equal to a total number of the subscriber operator instances.

12. The system of claim 9, wherein the instructions are to cause the processing resource to send the particular batch tuple to a first subscriber operator instance and a second subscriber operator instance if a hash value of the key-attributes of the first subscriber operator instance equals a hash value of the key-attributes of the second subscriber operator instance.

13. The system of claim 12, wherein the instructions are to cause the processing resource to create a shared batch corresponding to the first subscriber operator instance and the second subscriber operator instance.

14. The system of claim 10, wherein the particular batch tuple includes a key portion containing a number of key-attributes, and a payload portion that includes a number of grouped tuples.

\* \* \* \* \*